US012712097B2

(12) United States Patent
Thielking et al.

(10) Patent No.: US 12,712,097 B2
(45) Date of Patent: Aug. 18, 2026

(54) PATIENT SUPPORT APPARATUS WITH MATTRESS AND MATTRESS CABLE

(71) Applicant: Stryker Corporation, Kalamazoo, MI (US)

(72) Inventors: Matthew Thomas Thielking, Schoolcraft, MI (US); Michael W. Graves, Paw Paw, MI (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 18/723,735

(22) PCT Filed: Mar. 10, 2023

(86) PCT No.: PCT/US2023/014963
§ 371 (c)(1),
(2) Date: Jun. 24, 2024

(87) PCT Pub. No.: WO2023/177578
PCT Pub. Date: Sep. 21, 2023

(65) Prior Publication Data

US 2024/0404728 A1 Dec. 5, 2024

Related U.S. Application Data

(60) Provisional application No. 63/446,140, filed on Feb. 16, 2023, provisional application No. 63/319,472, filed on Mar. 14, 2022.

(51) Int. Cl.
*H01B 7/18* (2006.01)
*A61G 7/012* (2006.01)
(Continued)

(52) U.S. Cl.
CPC ............... *H01B 7/18* (2013.01); *A61G 7/012* (2013.01); *A61G 7/018* (2013.01); *A61G 7/0516* (2016.11); *A61G 7/0507* (2013.01)

(58) Field of Classification Search
CPC ...... H01R 13/24; H01R 13/58; H01R 13/516; H01R 13/6205; H01B 7/18; H02G 3/0406;
(Continued)

(56) References Cited

U.S. PATENT DOCUMENTS 2,234,982 A 3/1941 Ross
3,363,214 A 1/1968 Wright
(Continued)

FOREIGN PATENT DOCUMENTS

JP 2005-185346 A 7/2005
WO 2013/076542 A1 5/2013
(Continued)

OTHER PUBLICATIONS

US 6,264,473 B1, 07/2001, Bullinger et al. (withdrawn)
(Continued)

*Primary Examiner* — David R Hare
(74) *Attorney, Agent, or Firm* — Warner Norcross + Judd LLP

(57) ABSTRACT

A patient support apparatus is provided with a cable that couples to a mattress to provide power and/or data to the mattress with the cable configured with two cable portions—a first cable portion connected to the mattress and a second cable portion connected to the frame or another component at the patient support apparatus.

22 Claims, 10 Drawing Sheets

(51) Int. Cl.
*A61G 7/018* (2006.01)
*A61G 7/05* (2006.01)

(58) Field of Classification Search
CPC .......... A61G 7/012; A61G 7/018; A61G 7/05; A61G 7/0507; A61G 7/0516; A61G 2203/74
USPC ............................... 5/613; 439/447; 177/144
See application file for complete search history.

(56) References Cited

U.S. PATENT DOCUMENTS 3,521,216 A 7/1970 Tolegian
3,713,370 A 1/1973 Prijn
3,786,391 A 1/1974 Mathauser
3,808,577 A 4/1974 Mathauser
3,810,258 A 5/1974 Mathauser
4,080,038 A 3/1978 Latta et al.
4,095,870 A 6/1978 Mathe
4,317,969 A 3/1982 Riegler et al.
4,422,705 A 12/1983 Kasper
4,432,592 A 2/1984 Boutros et al.
4,664,464 A 5/1987 Hutter et al.
4,684,197 A 8/1987 Reichardt et al.
4,768,241 A * 9/1988 Beney ...................... A61G 7/05 5/503.1
4,804,338 A 2/1989 Dibble et al.
5,046,967 A 9/1991 Majernik et al.
5,178,559 A 1/1993 Mello
5,192,224 A 3/1993 Bernardini
5,243,510 A * 9/1993 Cheney, II ......... H01R 13/6675 439/620.09
5,276,432 A 1/1994 Travis
5,305,547 A 4/1994 Weiss
5,310,359 A 5/1994 Chadbourne
5,325,551 A 7/1994 Tappel et al.
5,335,384 A * 8/1994 Foster ...................... A61G 7/05 4/523
5,335,651 A * 8/1994 Foster .................. A61G 7/0528 5/503.1
5,401,175 A 3/1995 Guimond et al.
5,439,388 A 8/1995 Weiss et al.
5,481,939 A 1/1996 Bernardini
5,542,136 A * 8/1996 Tappel ............... A61G 7/05776 5/713
5,812,356 A 9/1998 O'Connor
5,829,987 A 11/1998 Fritsch et al.
5,909,100 A 6/1999 Watanabe et al.
5,921,783 A 7/1999 Fritsch et al.
5,941,729 A 8/1999 Sri-Jayantha
5,954,520 A 9/1999 Schmidt
5,975,956 A 11/1999 Huguenet
6,010,348 A 1/2000 Alden
6,155,866 A 12/2000 Liu et al.
6,196,864 B1 3/2001 Huguenet
6,267,602 B1 7/2001 Mendelson et al.
6,419,519 B1 7/2002 Young
6,428,357 B1 8/2002 Dolinshek et al.
6,846,201 B2 1/2005 Lazaro, Jr.
6,966,781 B1 11/2005 Bullinger et al.
7,044,795 B2 5/2006 Diep
7,311,526 B2 12/2007 Rohrbach et al.
7,329,128 B1 2/2008 Awad
7,351,066 B2 4/2008 DiFonzo et al.
7,376,992 B2 * 5/2008 Salt .......................... A61G 1/04 5/503.1
7,406,736 B2 8/2008 Flick
7,445,452 B1 11/2008 Wu
7,517,222 B2 4/2009 Rohrbach et al.
7,641,396 B2 1/2010 Feldner
7,641,477 B2 1/2010 DiFonzo et al.
7,645,143 B2 1/2010 Rohrbach
7,658,613 B1 2/2010 Griffin et al.
7,690,059 B2 4/2010 Lemire et al.
7,901,216 B2 3/2011 Rohrbach et al.
7,904,976 B2 * 3/2011 Hakamiun ............... A61G 7/05 5/53.1
7,986,242 B2 * 7/2011 Dixon .................. A61G 7/0513 340/665
8,087,939 B2 1/2012 Rohrbach et al.
8,177,560 B2 5/2012 Rohrbach et al.
8,348,678 B2 1/2013 Hardisty et al.
8,388,353 B2 3/2013 Kiani et al.
8,435,042 B2 5/2013 Rohrbach et al.
8,497,753 B2 7/2013 DiFonzo et al.
8,690,582 B2 4/2014 Rohrbach et al.
8,888,500 B2 11/2014 Gao et al.
8,894,420 B2 11/2014 Schichl et al.
8,910,334 B2 12/2014 Lafleche et al.
8,911,387 B2 12/2014 Lafleche et al.
8,920,179 B2 12/2014 Wei et al.
9,065,205 B2 6/2015 Gao et al.
9,077,105 B2 7/2015 Kim
9,112,304 B2 8/2015 Rohrbach et al.
9,149,186 B2 * 10/2015 Grayzel ................. A61B 5/303
9,196,979 B2 11/2015 Kim
9,306,322 B2 * 4/2016 Bhimavarapu .... H01R 13/6205
9,306,323 B2 4/2016 Kim
9,420,895 B2 8/2016 Lafleche et al.
9,461,403 B2 10/2016 Gao et al.
9,466,919 B2 10/2016 Kiani et al.
9,468,307 B2 10/2016 Lafleche et al.
9,490,578 B2 11/2016 Wu et al.
9,570,842 B2 2/2017 Nordgren et al.
9,634,428 B2 4/2017 DiFonzo et al.
9,660,376 B2 5/2017 Gao et al.
9,711,893 B2 7/2017 Rohrbach et al.
9,735,500 B2 8/2017 Magana et al.
9,820,904 B2 11/2017 Lafleche et al.
9,829,655 B2 11/2017 Erdman et al.
9,923,290 B2 3/2018 Gao et al.
9,985,384 B1 5/2018 Johnson et al.
10,090,618 B2 10/2018 Rohrbach et al.
10,130,536 B2 11/2018 Roussy et al.
10,357,185 B2 7/2019 Kostic et al.
10,381,774 B2 8/2019 Krize et al.
10,396,492 B2 8/2019 Krize et al.
10,454,208 B2 10/2019 Johnson et al.
10,490,933 B2 11/2019 Rohrbach et al.
10,507,158 B2 * 12/2019 Brzenchek ........... A61G 7/0506
10,522,943 B1 12/2019 Termini et al.
10,938,149 B2 3/2021 Li et al.
10,998,673 B2 5/2021 Johnson et al.
11,033,233 B2 6/2021 Hayes et al.
11,070,004 B2 7/2021 Lee
11,233,356 B2 1/2022 Rohrbach et al.
11,490,834 B2 11/2022 Sukumaran et al.
11,666,498 B2 6/2023 Nahavandi et al.
11,801,177 B2 10/2023 Nahavandi et al.
2006/0117482 A1 * 6/2006 Branson ............. A61G 7/05769 5/600
2007/0163045 A1 7/2007 Becker et al.
2007/0254510 A1 11/2007 DeBey
2008/0109964 A1 * 5/2008 Flocard ................ A61B 5/6891 5/713
2011/0072584 A1 * 3/2011 Hornbach .............. A61G 7/018 5/613
2012/0071008 A1 3/2012 Sessford
2012/0252231 A1 10/2012 Kall
2014/0015677 A1 * 1/2014 Tallent ................... G16H 50/30 340/573.4
2014/0057463 A1 * 2/2014 Bhimavarapu .......... A61G 7/00 439/39
2019/0231620 A1 * 8/2019 Menkedick .......... G01G 19/445
2020/0112124 A1 4/2020 Termini et al.
2021/0052197 A1 2/2021 Sukumaran et al.
2021/0173947 A1 6/2021 Li et al.
2021/0218184 A1 7/2021 Termini et al.
2021/0273375 A1 9/2021 Johnson et al.
2022/0045456 A1 2/2022 Johnson et al.
2022/0045457 A1 2/2022 Chuang et al.

(56) References Cited

U.S. PATENT DOCUMENTS

| | | | | |
|---|---|---|---|---|
| 2022/0102910 | A1 | 3/2022 | DiFonzo et al. | |
| 2022/0273114 | A1* | 9/2022 | Long .................. | A61G 7/05715 |

FOREIGN PATENT DOCUMENTS

| | | | |
|---|---|---|---|
| WO | 2013/165049 | A1 | 11/2013 |
| WO | 2020/049136 | A1 | 3/2020 |
| WO | 2020/257475 | A1 | 12/2020 |
| WO | 2023/064183 | A1 | 4/2023 |

OTHER PUBLICATIONS

International Search Report and Written Opinion of the International Searching Authority for International Application No. PCT/US2023/014963 mailed Jul. 19, 2023, pp. 1-10.

Onanon connectors located at http://onanon.com/ and available at least as of Mar. 8, 2022, p. 1.

Amphenol 97 Series Standard Cylindrical Connector 12-022-19, located at amphenol-industrial.com and available at least as of Dec. 2, 2024, pp. 1-37.

* cited by examiner

PATIENT SUPPORT APPARATUS WITH MATTRESS AND MATTRESS CABLE

BACKGROUND

The present disclosure relates to patient support apparatuses, such as beds, cots, stretchers, recliners, or the like. More specifically, the present disclosure relates to patient support apparatuses that include a pad or mattress with a mattress cable.

Existing patient support apparatuses, such as hospital beds and/or stretchers, often include a pad or mattress to form a patient support surface. The pads or mattresses are typically supported on an articulatable litter deck (often referred to as the "Litter"), with a back deck section (referred to as the "Fowler"), a seat deck section, and a thigh deck section, which may or may not have a separate foot deck section, with some of the deck sections being adjustable to allow a caregiver or patient to adjust the angle of the respective deck section. To adjust the deck configuration, the patient support apparatus includes actuators to move the respective deck sections.

More recently, patient support surfaces have become smarter surfaces-they may have sensors or they may have controls to inflate or deflate bladders that may be incorporated into the patient support surface. In some cases, the litter deck and/or the patient support surface is configured to widen and/or lengthen to accommodate larger or taller patients.

The sensors may be used for feedback on the control of the bladders or may be used to monitor the patient, such as vital signs, temperature, moisture (e.g., at the interface with the patient support surface). Further, some mattress with bladders, which form at least part of the patient support surface, may incorporate a pump or pumps and pneumatic control systems, as well as logic systems, typically in a housing at the foot end of the mattress. As a result, patient support surfaces may have one or more cables to provide power, data, etc., to or from the patient support surface to controls located in the patient support apparatus or other controls, such as external pump control housings, which may be supported on the footboard. These cables, however, can limit or be damaged by movement of the mattress, for example, when a caregiver needs to lift up the mattress, for example to clean under the mattress, or when the mattress or patient support apparatus is lengthened. Additionally, these cables may interfere with or be damaged by side rails when the side rails are raised or lowered, given their proximity to the side rails.

Accordingly, there is a need for a way to protect these cables and other cables that may be used on a patient support apparatus.

SUMMARY

In one form, a patient support apparatus includes a frame and a mattress supported relative to the frame. The patient support apparatus includes a cable that couples to the mattress to provide power and/or data to the mattress with the cable configured with two cable portions-a first cable portion connected to the mattress and a second cable portion connected to the frame or another component at the patient support apparatus. The cable also includes a first connector coupled to the first cable portion and a second connector coupled to the second cable portion, which form a connector assembly that provides a breakaway connection, which when connected allows the two cable portions to communicate (electrical current and/or signals) through the first and second connectors and when disconnected disconnect the two cable portions.

In one aspect, at least one of the first and second cable portions includes a sleeve extending around the cable portion to stiffen the cable portion where the connector assembly is mounted to the respective cable portion.

For example, in one form, the sleeve extends from the respective connector along the respective cable portion in a range of about 5-10 inches, in a range of about 6-8 inches, or about 7½ inches.

In a further aspect, the sleeve on the first cable portion extends around a portion of the respective connector. For example, each connector may have a connector body and a transition between the connector body and the respective cable portion. The sleeve may extend over the transition portion of the connector and, optionally, also over a portion of the connector body.

In one aspect, the sleeve may be flared to at least partially cover the respective connector body.

In another form, each cable portion has a sleeve-a first sleeve on the first cable portion, and a second sleeve on the second cable portion. The first sleeve may extend from the first connector along the first cable portion in a range of about 5-10 inches, in a range of 6-8 inches, or about 7½ inches, while the second sleeve may extend from the second connector along the second cable portion in a range of about ½-2 inches, in a range of about 1-1½ inches or about 1 inch.

In another form, the cable has a longitudinal axis that extends between the first and second cable connectors. Each of the connectors has a length extending along the longitudinal axis, with the sleeve extending along the respective cable portion for at least the length of the respective connector.

In another form, the cable has a cable core and a cable casing surrounding the cable core, with the sleeve having a greater thickness than the cable casing.

In another form, the cable has a cable core and a cable casing surrounding the cable core, with the cable casing being formed from a first material having a first stiffness. The sleeve is formed from a second material having a second stiffness greater than the first stiffness of the first material of the cable casing.

For example, the first material may comprise a plastic or rubber coating with a Shore A hardness in a range of about 40A to 80A. The sleeve or sleeves may comprise a rubber or plastic with a hardness in a range of about 40A to 80A.

In another form, the frame includes a litter frame and an articulatable litter deck supported on the litter frame. The frame also supports a control board and a side rail, which is movable relative to the litter frame and the mattress from one or more raised positions to a lowered position. The mattress is supported on the articulatable deck and has a foot end adjacent the footboard. The side rail is spaced from the litter frame to form an envelope through which the cable extends from the foot end of the mattress, with the breakaway connection located in the envelope.

In one aspect, the litter deck has a top side, and the envelope is also defined below the top side of the litter deck.

In another form, the mattress includes a mattress control housing at its foot end. The first cable portion is secured to the mattress control housing, for example, by a clip. Optionally, the first cable portion is secured to the mattress control housing and to the cable along the sleeve.

In any of the above, the mattress may include a cable support assembly that is integral to the mattress. The cable support assembly may include an exterior panel and an interior panel, and wherein the interior panel is coupled to the cable. The exterior panel may be partially joined to the mattress leaving an opening through which the cable passes, wherein the opening is disposed below an opening in the mattress to substantially prevent intrusion of water into the mattress.

In any of the above, the connector assembly may comprise a magnetic breakaway connector assembly. For example, one of the connectors may comprise a female magnetic connector, and the other a male magnetic connector. Further, one or both may be keyed to ensure proper alignment and connection between the two connectors.

In general, one aspect of the subject matter described herein can be provided in a patient support for a patient. The patient support apparatus may include a frame and a side rail mounted relative to the frame. The side rail may be spaced by a distance from the frame and may be movable between raised and lowered positions. The patient support apparatus may include a mattress supported relative to said frame and a mattress cable configured for at least one of power and communication. At least a portion of the mattress cable may be provided with increased stiffness to maintain the mattress cable in a space between the side rail and the frame to reduce disconnection of the mattress cable during normal use of the patient support apparatus.

The foregoing and other aspects can each optionally include one or more of the following features, alone or in combination. In particular, one configuration includes all the following features in combination.

In some aspects, the mattress cable may include at least a first cable portion connected to the mattress and a second cable portion connected to the frame or another component at the patient support apparatus. The mattress cable may include a first connector coupled to the first cable portion and a second connector coupled to the second cable portion forming a connector assembly, which may be configured as a breakaway connection.

In some aspects, the connector assembly may be provided in the space between the side rail and the frame.

In some aspects, at least one of the first and second cable portions may include a sleeve extending around the respective first and second cable portions. The sleeve may provide stiffness adjacent a respective one of the first and second connectors mounted to the at least one first and second cable portions.

In some aspects, the respective one of the first and second connectors has a connector body and a transition between the connector body and a respective one of the first and second cable portions. The sleeve on the respective one first and second cable portions may extend around a portion of the respective one of the first and second connectors.

In some aspects, the mattress may include a mattress control housing, and where the first cable portion may be secured to a side of the mattress control housing along the sleeve.

In some aspects, the mattress may include a cable support assembly that is integral to the mattress.

In some aspects, the cable support assembly may include an exterior panel and an interior panel, and where the interior panel may be coupled to the mattress cable.

In some aspects, the exterior panel may be partially joined to the mattress leaving an opening through which the mattress cable passes, where the opening defined at least in part by the exterior panel may be disposed below an opening in the mattress to substantially prevent intrusion of water into the mattress.

Before the various embodiments disclosed herein are explained in detail, it is to be understood that the claims are not to be limited to the details of operation or to the details of construction and the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION

Figure 1:
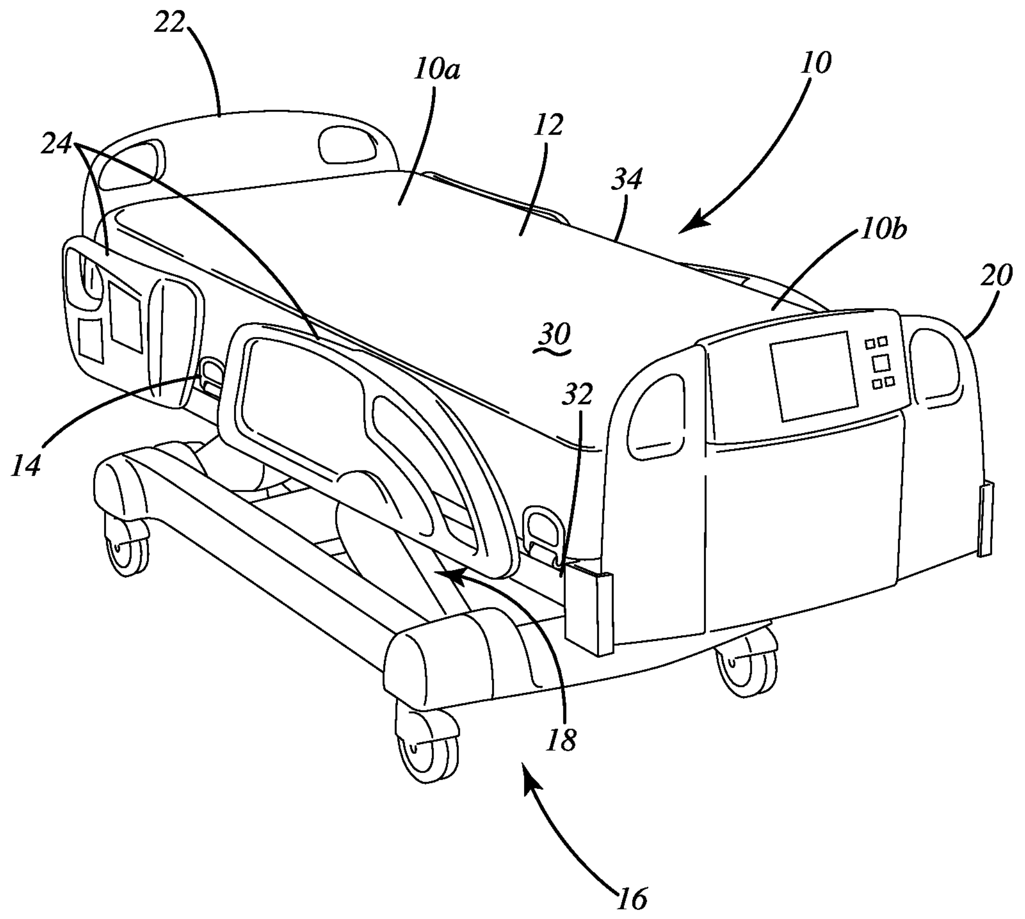
FIG. 1 is a perspective view of a patient support apparatus according to one embodiment of the disclosure.

Referring to FIG. 1, the numeral 10 generally designates a patient support apparatus. Although the particular form of patient support apparatus 10 illustrated in FIG. 1 is a bed adapted for use in a hospital or other medical setting, it will be understood that patient support apparatus 10 may be a cot, a stretcher, a gurney, a recliner, a residential bed, or any other structure capable of supporting a patient, whether stationary or mobile and/or whether used in a medical or residential setting.

Figure 2:
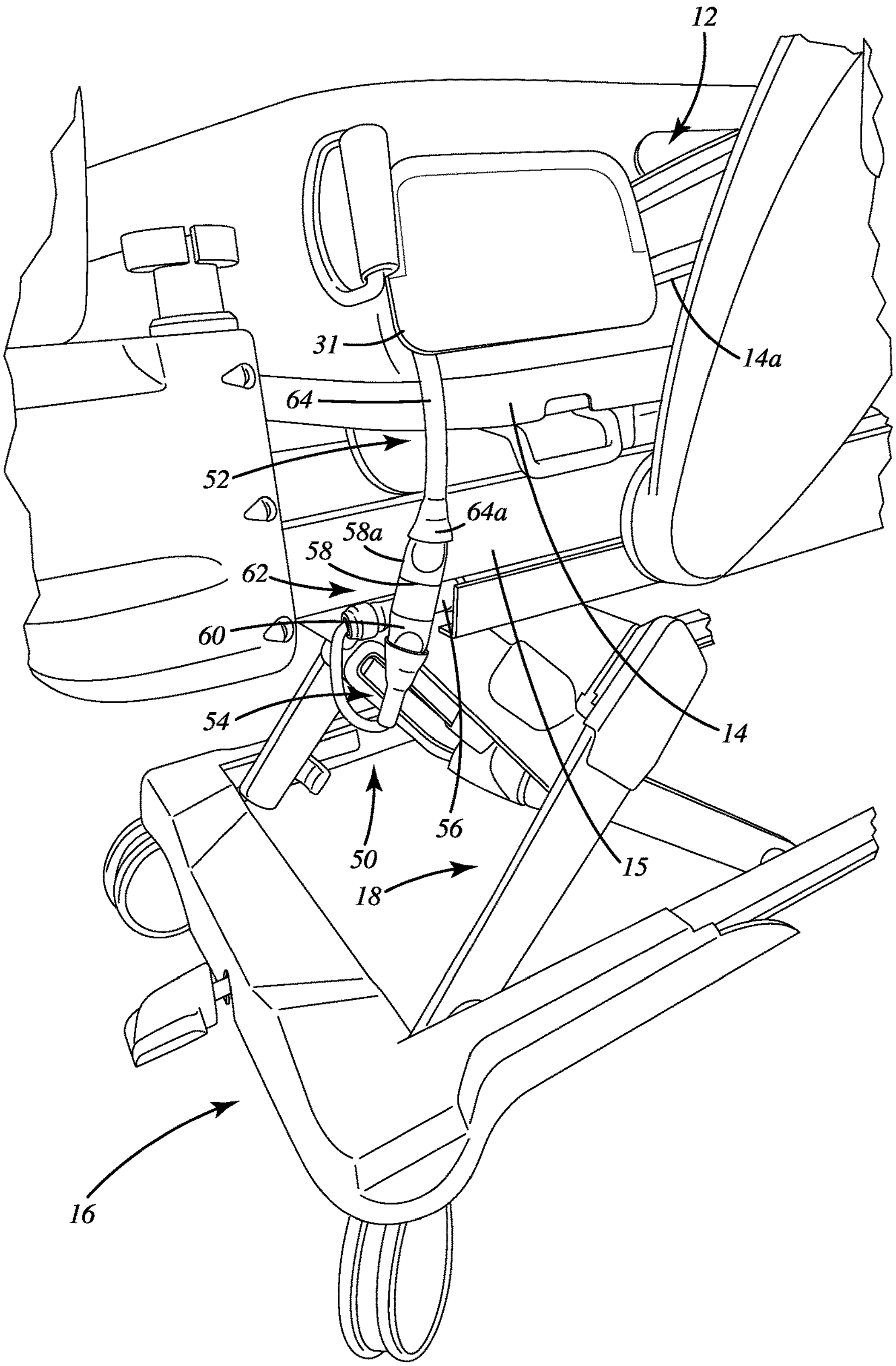
FIG. 2 is an enlarged side elevation view of the patient support apparatus with the side rail raised illustrating a mattress cable at the foot end of the patient support apparatus and of the mattress.

In general, patient support apparatus 10 includes a mattress 12 that is supported on a litter deck 14 (e.g., a patient support deck), which in turn is supported on a litter frame 15 (e.g., FIG. 2). Litter deck 14 may have one or more articulatable deck sections, including a back deck section ("Fowler"), a seat deck section, and a thigh deck section, which together with the litter frame 15 are supported on a wheeled base 16 by a lift assembly 18. Patient support apparatus 10 further includes a footboard 20, a headboard 22, and a plurality of side rails 24. Side rails 24 are all shown in a lowered position in which ingress into, and egress out of, patient support apparatus 10 is not obstructed by the lowered side rails 24. Each side rail is configured so it can be individually moved to a raised position. Side rails 24 may be moved to one or more intermediate positions as well.

Lift assembly 18 is adapted to raise and lower the litter frame and litter deck 14 with respect to base 16 and may incorporate actuators, such as electric actuators, hydraulic actuators, pneumatic actuators, or any other suitable device for extending the lift assembly 18 for raising and lowering the litter frame and litter deck 14. The actuators may be operated independently so that the litter frame and litter deck may be tilted (with respect to base 16), such as in a Trendelenburg orientation or in a reverse Trendelenburg orientation. The patient support apparatus 10 may also incorporate actuators, such as electric actuators, hydraulic actuators, pneumatic actuators, or any other suitable device, for moving the individual deck sections. The head deck section, which as noted may be referred to as the Fowler, is pivotable about a generally horizontal pivot axis between a generally horizontal orientation (shown in FIG. 1) and a plurality of raised positions (not shown). The thigh deck section (and optional foot deck section) may also be pivotable about generally horizontal pivot axes.

In some embodiments, patient support apparatus 10 may be modified from what is shown to include one or more components adapted to allow the user to extend the width of litter deck 14, thereby allowing patient support apparatus 10 to accommodate patients of varying sizes. For example, the width of litter deck 14 may be adjusted, between a first width, a second or intermediate width, and a third or expanded width. The first width may be, for example, a 36 inch width, the second intermediate width may be, for example, a 42 inch width, and the third expanded width may be, for example, a 48 inch width, although these widths may be varied.

As used herein, the term "longitudinal" refers to a direction parallel to a central axis between the head end 10*a* and the foot end 10*b* of patient support apparatus 10. The terms "transverse" or "lateral" refer to a direction perpendicular to the longitudinal direction and parallel to a surface on which the patient support apparatus 10 rests.

The mattress 12 may comprise a variety of different mattresses with a variety of different cushioning components, such as foam, foam in combination with bladders, foam in combination with one or more gel layers, or foam in combination with bladders and one or more gel layers, and may include a mattress control system incorporated into the mattress and contained, for example, within the foot end of the mattress in a mattress control housing, such as disclosed in U.S. Pat. Nos. 5,542,136; 5,325,551; 8,910,334 (STR03A-P239A); 8,911,387 (STR03A-P257A); U.S. Pat. Nos. 7,406,736; 9,820,904 (STR03A-P376A), and 9,468,307 (STR03A P400A), which are commonly owned by Stryker Corporation of Kalamazoo, Michigan, and are incorporated by reference in their entireties herein.

In one aspect, the mattress 12 may include a cover 30 that includes an upper cover portion 34 and a lower cover portion 32, which may be joined together at a seam by a perimeter zipper, such as a full perimeter zipper or partial perimeter zipper, to facilitate removal for cleaning or replacement of the cover from the mattress 12. The upper and lower portions 34, 32 of the cover 30 may be joined by a seam formed by stitching so that the upper cover portion 34 is not completely detachable from lower cover portion 32, and with the remainder of the upper and lower portions 34, 32 of cover 30 joined with a partial perimeter zipper, e.g., a zipper that extends only around a portion of the perimeter of the main cushion 12. The location of the zipper may vary, but in one aspect the zipper is located along longitudinal and lateral sides between the top and lower sides of the mattress 12 and, optionally, about midway between the top and lower sides mattress 12.

The cover 30 may, for example, be formed from a flexible liquid impermeable panel of material, such as polyurethane, polyurethane coated fabrics, or nylon, which forms the exterior surface of cover 30. Further, the cover 30 may include one or more additional panels of material similar to or the same as the exterior surface panel. Additional panels may be joined with the exterior surface panel, for example, by stitching, and may form the inner or interior surface of the cover 30.

In order to supply power to and/or communicate with the components within the mattress control housing, patient support apparatus 10 includes a cable 50, which is in communication with the mattress control board in the mattress control housing. Cable 50 may be in communication with cabling that extends through the litter frame 15, with the main patient support control board or another control board, such as a control board in the footboard or with an external pump control housing mounted to the footboard.

As best seen in FIG. 2, cable 50 couples to the mattress at the foot end of the mattress (where the mattress control housing is located, as noted) to provide power and/or data to the mattress.

Cable 50 is configured with two cable portions-a first, upper cable portion 52, which is connected to the mattress, namely to the mattress control board in the mattress control housing, and a second, lower cable portion 54 that is connected to cabling supported in the litter frame via a connection 56. Connection 56 may be mounted to the underside of litter frame 15. As noted above, the cabling supported by the litter frame may be in communication with the main control board on the patient support apparatus or other another control board, either directly or through the main control board.

Figure 5:
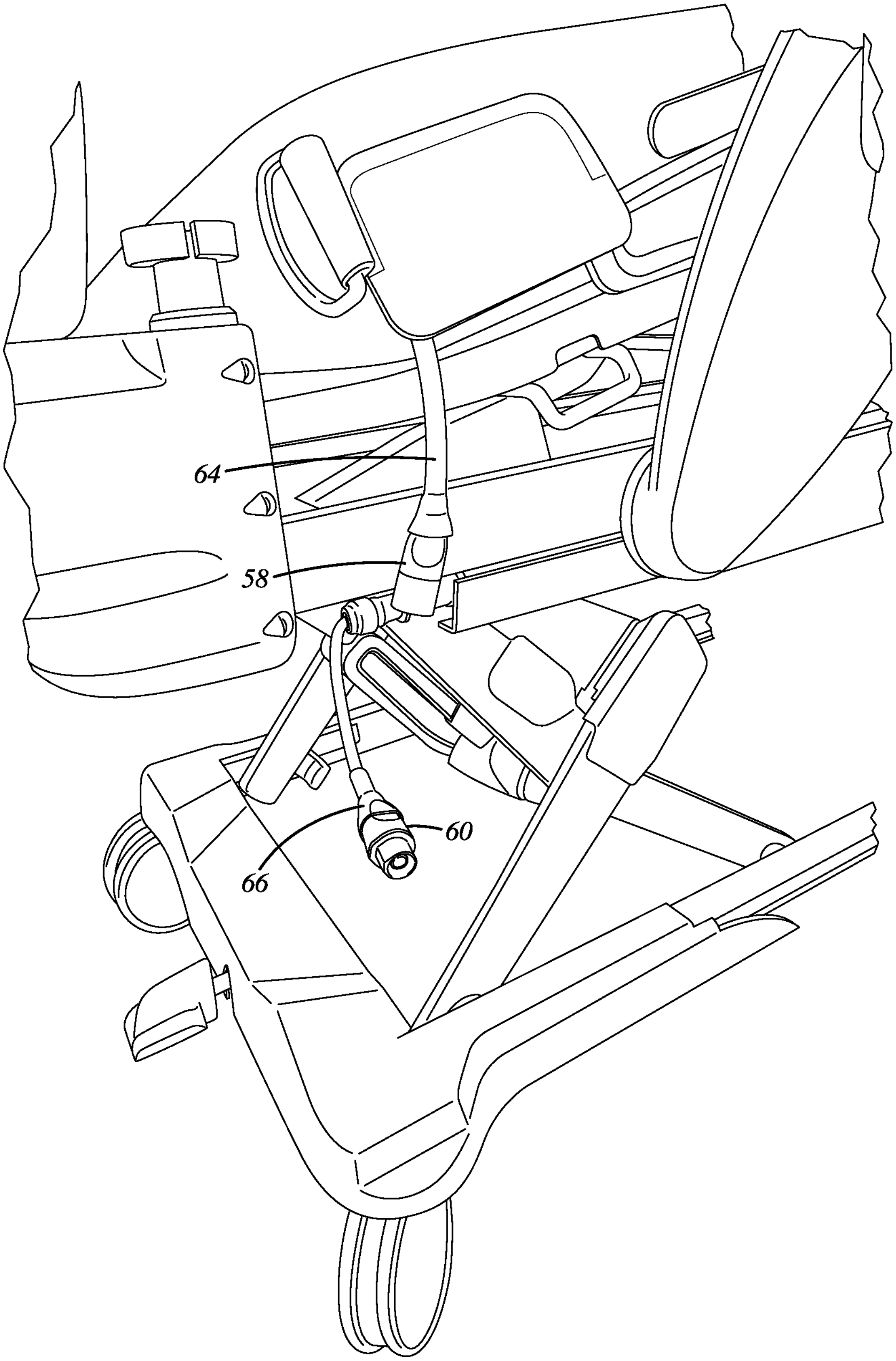
FIG. 5 is an enlarged view similar to FIG. 3 illustrating the cable disconnected at the cable connector assembly.
Figure 6:
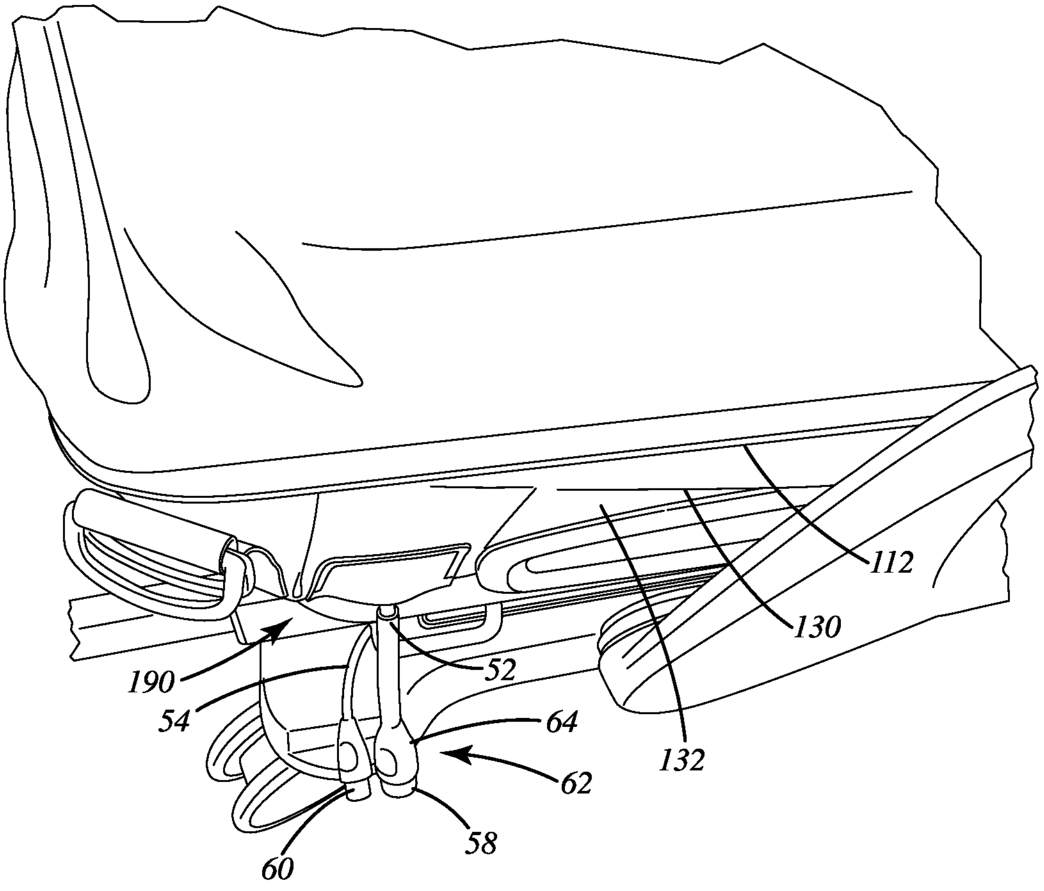
FIG. 6 is a perspective view of a patient support apparatus according to one embodiment of the disclosure.

Cable 50 also includes a first connector 58 coupled to the distal end of upper cable portion 52 and a second connector 60 coupled to the upper end of lower cable portion 54, which form a connector assembly 62 that provides a breakaway connection, which when connected allows the two cable portions to communicate (electrical current and/or signals) through the first and second connectors and when disconnected disconnect the two cable portions. For example, a suitable connector assembly may comprise a magnetic breakaway connector assembly, such as is available from Onanon. Further, one of the connectors may comprise a female magnetic connector, and the other a male magnetic connector. Alternately or additionally, one or both connectors may be keyed to ensure proper alignment and connection between the two connectors. In the illustrated embodiment, both connectors are keyed (see FIG. 5).

In order to maintain the position of the cable 50 relative to the patient support apparatus, and particularly relative to the litter deck and foot end side rail, at least the upper cable portion 52 includes a sleeve 64 that extends around the cable to stiffen at least the upper cable portion 52 of the cable 50. See FIG. 3A, where only one sleeve is used. The upper cable portion 52 extends from the mattress (and mattress control housing) with connector 58 of connector assembly 62 and is mounted to its distal end. For example, the sleeve 64 may extend from the respective connector 58 along the respective cable portion in a range of 5-9 inches, in a range of 6-8 inches, or about 7½ inches. Further, as described below, sleeve 64 may extend to the cable's connection to the mattress control housing.

Sleeve 64 may be a tubular sleeve with a continuous wall or may have a split wall construction so that the sleeve may be mounted to the cable through the split in the sleeve. When formed with a continuous wall, sleeve 64 may be a heat shrink mounted sleeve, for example. Further, the sleeve 64 may include a flared portion 64*a* that also covers a portion of the connector body 58*a* of the respective connector 58 (see e.g., FIG. 2), which can provide additional strain relief for the connection between connector assembly 62 and the respective cable portion. For example, see FIG. 3A where sleeve 64 alternately terminates adjacent the connector body.

In order to maintain the position of the cable, sleeve 64 is configured to stiffen the respective cable portion. For example, sleeve 64 may be made from a similar material to the cable casing but with an increased thickness or may be made from a material that is stiffer than the cable casing or both. In other words, in one example, the cable, which has a cable core and a cable casing surrounding the cable core, may have a cable casing formed from a first material having a first stiffness, while the sleeve may be formed from a second material having a stiffness greater than the stiffness of the material of the cable casing. In another example, the cable may have a cable casing thickness that is less than the thickness of the sleeve, again to make the sleeve stiffer than that portion of the cable.

For example, cable casings are typically formed from rubber, neoprene, or a polymer, such as heat stabilized nylon or polyethylene (PE), or polyvinyl chloride (PVC) or polytetrafluoroethylene (PTFE) or thermoplastic polyurethane (TPU), and have a thickness, for example, of less than 1 mm and in a range of about 0.5 mm to 1 mm, about 0.6 to 0.9 mm, and optionally about 0.7 to 0.8 mm. Sleeve 64 may be formed from the same material as the cable casing as noted, but has a thickness of 50%, 100% or more of the cable casing thickness in order to provide the desired stiffness described more fully below. Alternately, the sleeve may be made from a stiffer material than the cable casing, such as polyolefin or other heat meltable adhesives that flow when heated, and as noted may be formed about the respective cable portion by heat shrinking. When formed from heat shrinking, for example, the thickness may fall in a range of about 0.8 mm to 3 mm, or about 1-2 mm.

In the illustrated embodiment shown in FIGS. 2-5, each cable portion 52, 54 may have a sleeve—a first sleeve 64 on the upper cable portion 52, and a second sleeve 66 on the lower cable portion 54. The second sleeve 66 may extend from the second connector along the second cable portion in a range of ½-2 inches, in a range of 1-1½ inches or about 1 inch. However, it should be understood that only the upper cable portion may have the sleeve, which may be sufficient to maintain the position of the cable in the envelope described below. For further details of the sleeve 66, reference is made to sleeve 64.

In general, the sleeve or sleeves provide added stiffness to the cable such that when the cable portion is cantilevered over a length of about 6-12 inches, the cable portion will not deflect under the force of gravity even when the connector is mounted to its distal end. However, the sleeve still provides flexibility to the respective cable portion so that when an external force is applied to the sleeved cable portion it will deflect so that it retains sufficient flexibility to be able to move, but only when a sufficient force is applied.

With this added stiffness, the cable portions, when coupled together as shown in FIG. 2, will generally remain in the envelope (see e.g., FIG. 4) between the side rail and the litter frame so that when the side rail is raised or lowered the side rail will not accidently disconnect the cable's breakaway connection. Further, the cable 50 is provided with additional slack, e.g., four inches, so that even if the caregiver raises the mattress, the bed is extended, or the mattress gravitates, which is typically no more than four inches, the breakaway connection will not likely separate. Hence, the cable will maintain proper electrical connection during normal bed and mattress functions, but will allow for safe disconnect during a misuse event.

Additionally, with the limited slack and the retention of the cable within the envelope, the cable is in effect "pok e yoked" (Japanese term for mistake proofing) so that it is hard for a caregiver to plug the cable in the wrong way—in other words, it can only be installed the correct way, namely outside of the bed frame in this instance.

Figure 2A:
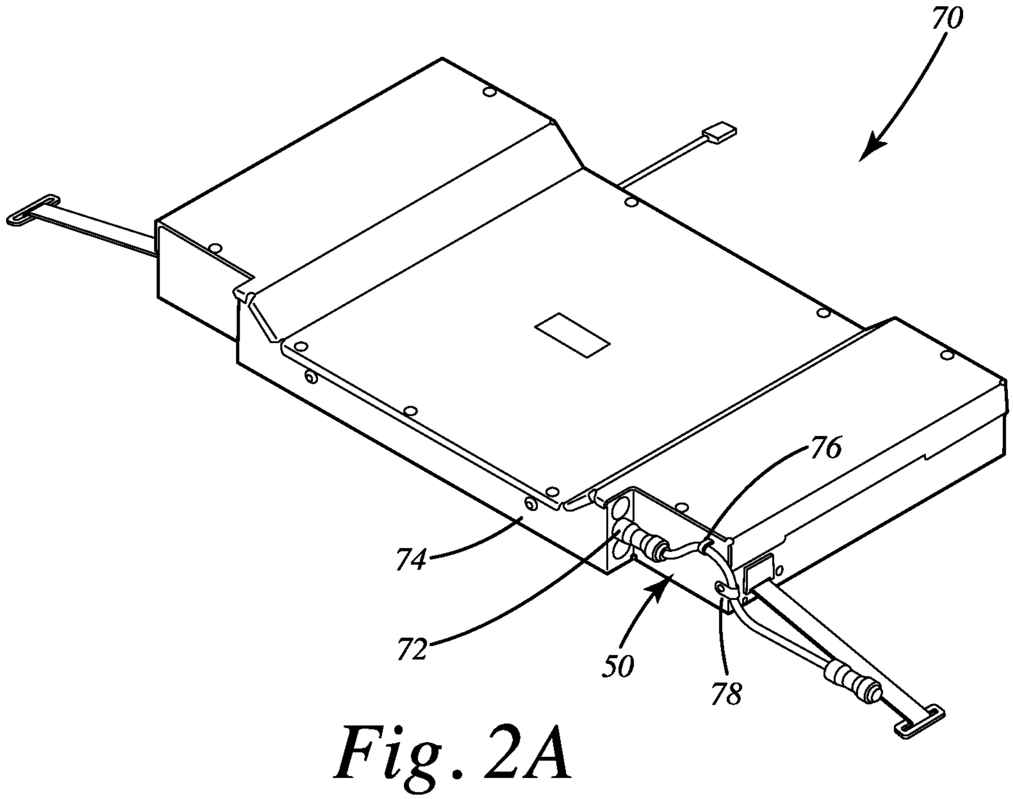
FIG. 2A is an enlarged view of the mattress control housing removed from the foot end of the mattress for clarity.
Figure 2B:
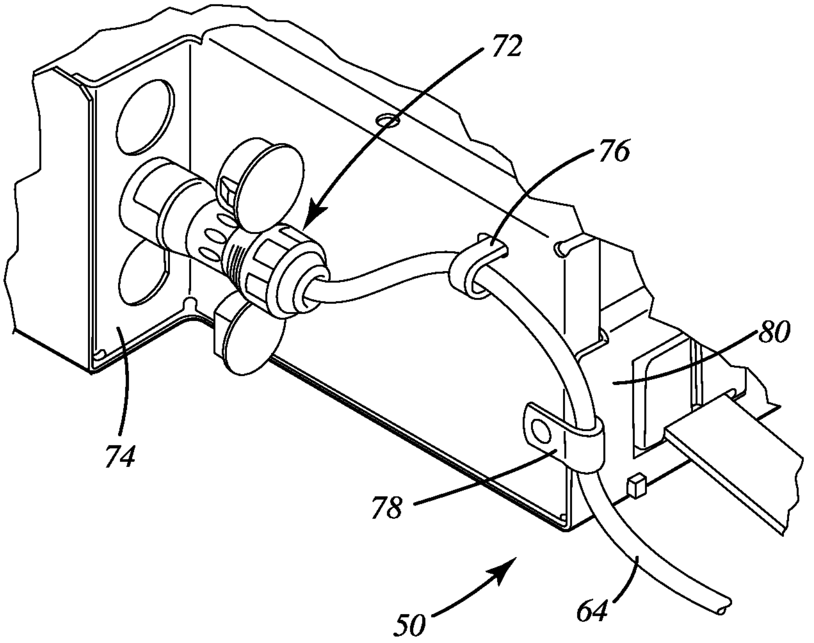
FIG. 2B is an enlarged fragmentary view of the mattress control housing illustrating the mounting arrangement of the mattress cable to the mattress control housing.

As noted above, at least sleeve 64 is provided to help maintain the position of the cable 50. As best seen in FIGS. 2A and 2B, cable 50, which extends from the mattress 12 (see FIGS. 2-5), extends from mattress control housing 70, which houses the mattress control board and any pneumatics for controlling bladders in the mattress. Mattress control housing 70 is located in the foot end 12*b* of the mattress 12 and may have a connection 72 mounted in the side wall 74 of the mattress control housing 70 for the cable 50 to couple to the mattress control board or an opening to allow the cable 50 to pass through the housing and connect directly with the mattress control board.

Sleeve 64 extends from connector 58 to the last point of connection to the mattress control housing. The last point of connection to the mattress control housing dictates the vertical axis along which the cable 50 is to generally extend. In the illustrated embodiment, cable 50 is mounted to and connected with mattress control housing 70 at two locations. Again referring to FIGS. 2A and 2B, a first connection 76 is provided that simply provides a guide to support cable 50 as it exits or extends from mattress control housing. Notably, FIG. 2A shows the cable without the sleeve. A suitable guide may comprise a c-clip.

A second connection 78 is provided to support and anchor the cable 50 to the outer side 80 of mattress control housing 70 to locate the cable in a vertical orientation relative to the mattress housing and, hence, mattress 12 and, further, in space or in an envelope relative to patient support apparatus 10 between the side rail 24 and the litter deck 15. Second connection 78 may be provided by a p-clip and is located along a portion of the cable where the sleeve is located (close the end of the sleeve) so that sleeve will then locate the remainder of the cable portion (and the cable portion that connects to the upper cable portion) in the desired envelope. In this manner, the stiffness in the sleeve allows the cable 50 to maintain its position relative to the last connection point on the mattress control housing in a vertical orientation to that it passes through the desired space or envelope in the patient support apparatus.

Figure 3:
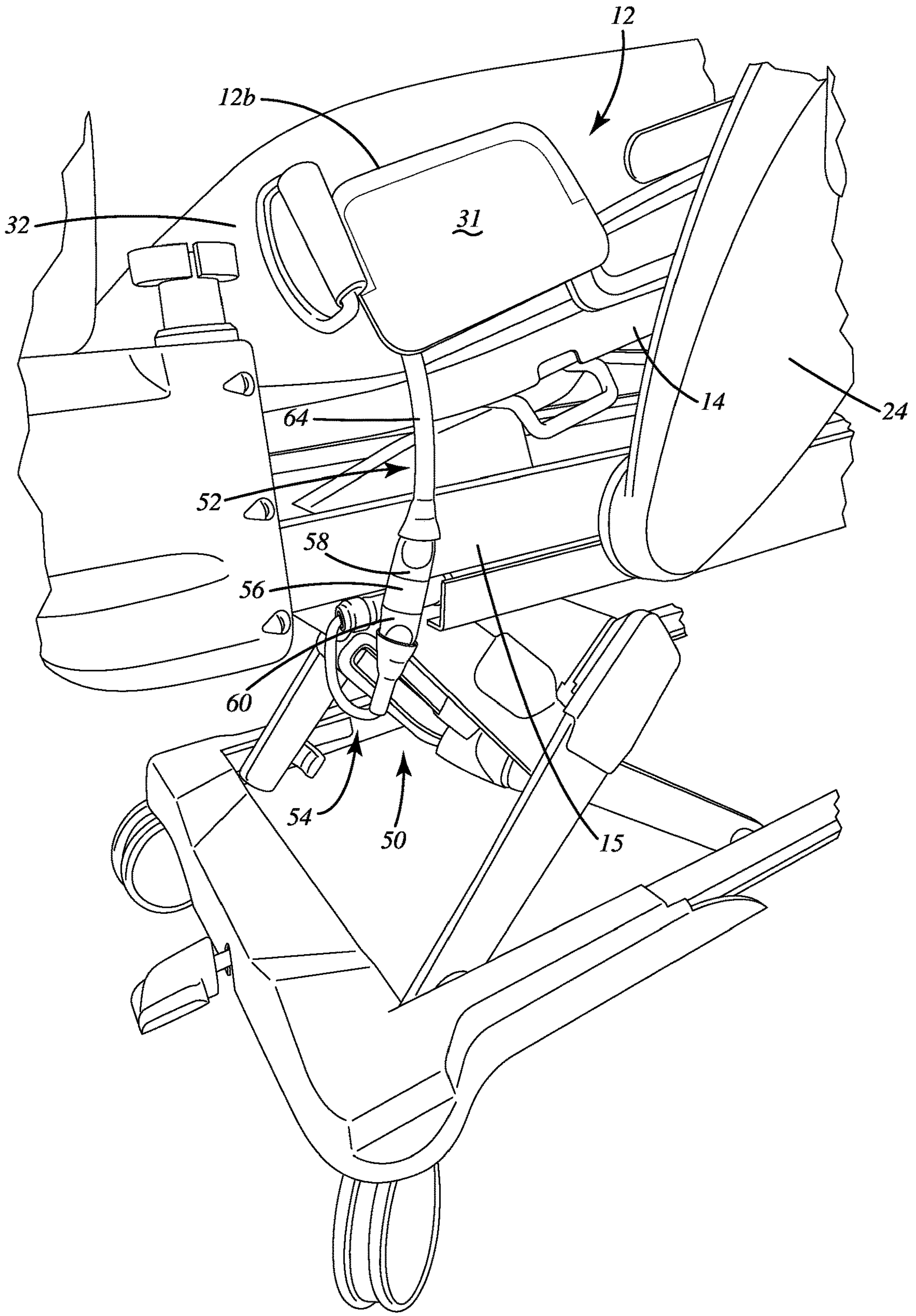
FIG. 3 is a similar view to FIG. 2 with the CPR strap tucked under the mattress to provide a better view of the litter deck and litter frame.
Figure 3A:
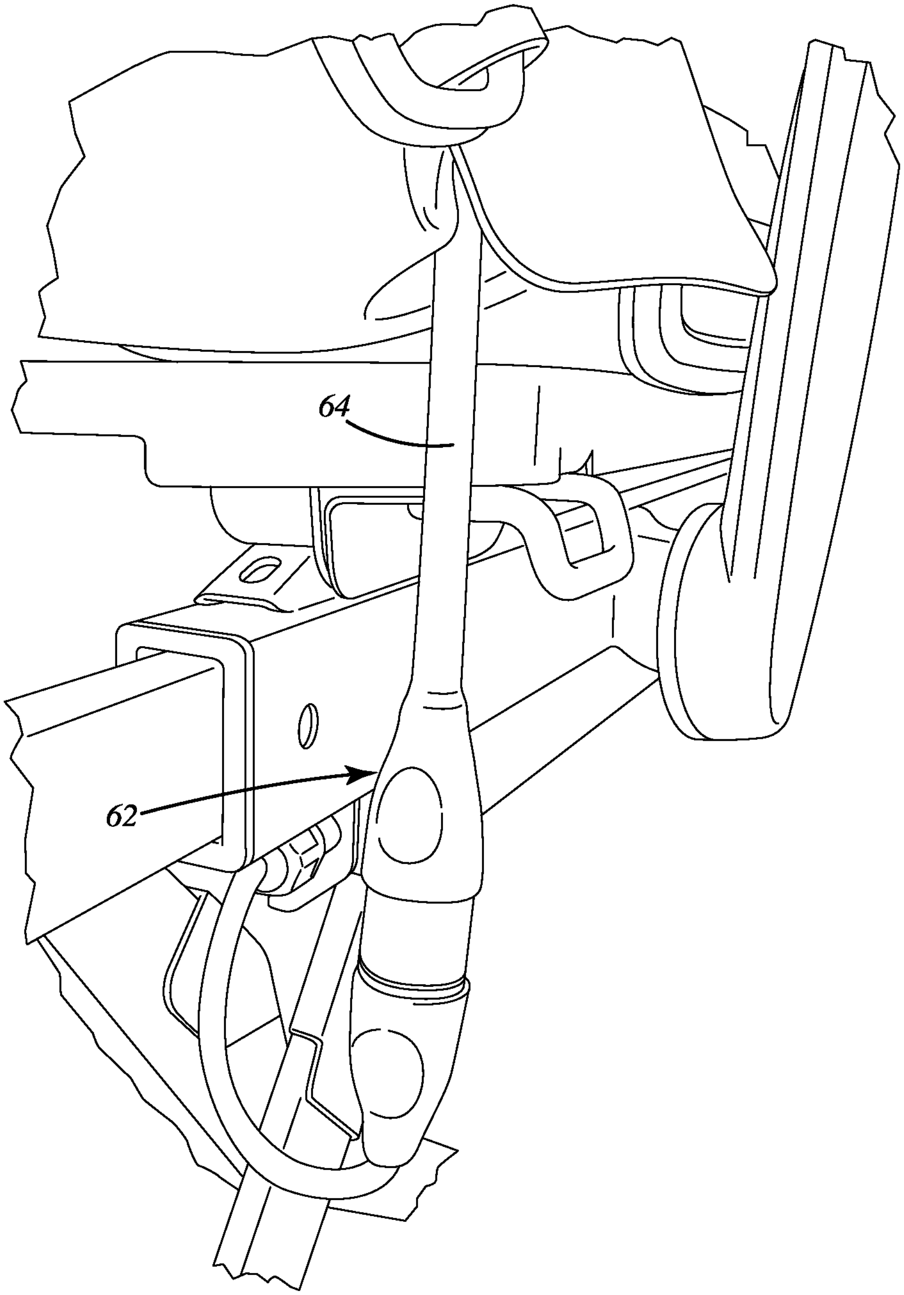
FIG. 3A is a similar view to FIG. 3 with the CPR strap shown at the side of the mattress and with a single sleeve mounted to the upper cable portion.
Figure 4:
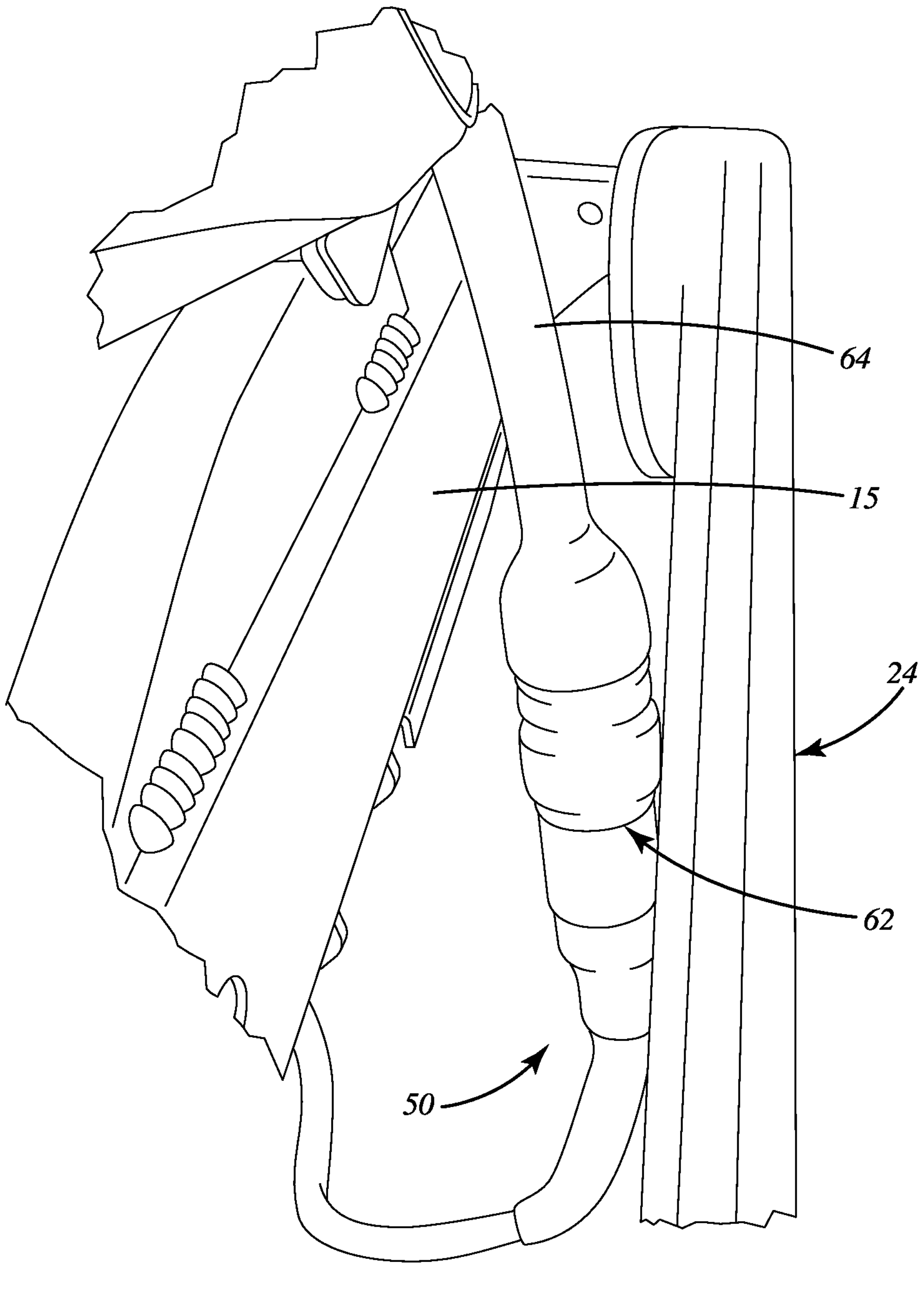
FIG. 4 is an enlarged view looking down into the side of the patent support apparatus to view the cable passing through the envelope between the side rail and litter frame.

The cable 50 may pass through an aperture (not shown) in the cover 30 such that the first connector 58 is accessible external to the cover 30 for connection to the second connector 60. The second connection 78 may be proximal to the aperture in the cover 30, providing support for the positioning of the cable 50 without substantially relying on the aperture in the cover 30 to support the cable 50. In FIG. 3, the aperture in the cover 30 is provided in the lower cover portion 32, and a flap 31 is provided over the aperture to substantially prevent moisture intrusion through the aperture. For instance, the flap 31 may be connected to the lower cover portion 32 at an upper portion of the flap 31, while a lower portion of the flap 31 may be separable from the lower cover portion 32. With the lower portion of the flap 31 being below the aperture and the upper portion of the flap 31 being connected to the lower cover portion 31, the flap 31 may help to shield the aperture against entry of moisture. Further moisture shielding may be provided by connecting at least a portion of the sides of the flap proximal to the upper portion of the flap 31.

As understood patient support apparatus 10, therefore, includes a frame or frames that supports the mattress, which include a litter frame and an articulatable litter deck supported by or on the litter frame. The frame also supports the footboard and the side rails, which are movable relative to the litter frame and mattress from one or more raised positions to a lowered position and is spaced by a distance from the litter frame to form a vertical envelope. The litter deck 14 has a top side 14*a*, which further defines a horizontal plane within the envelope which is desirable to locate the connector assembly to avoid interference from the nearest side rail (e.g., foot end side rail) as it is raised and lowered. Thus, the cable with its stiffening sleeve extends from or near the foot end of the mattress through the envelope to the frame, and the connector assembly that provides the breakaway connection may be located in the envelope below the top side of the litter deck.

As noted above, the sleeve or sleeves provide a desired increased stiffness to the cable so that the connector 78 can locate the cable and its breakaway connection in a desired space to avoid in advertent disconnect of the cable during normal use.

It is noted that the present disclosure is not limited to use of the cable 50 in conjunction with the mattress 12 depicted in FIGS. 1-5. For instance, a mattress 112 similar in some but not all respects is depicted in FIGS. 6-9 along with the cable 50. The mattress 112 may include a cover 130 that provides an aperture through which the cable 50 may pass and that enables the first connector 58 to be accessible external to the cover 30 for connection to the second connector 60. The cover 130, as described herein, may include multiple panels, each of which may be formed of a pliable material. The pliability of one panel may be the same or different from the pliability of another panel or the cover 130, itself. For instance, an interior panel 195 or an exterior panel 192, or both, may be the same pliability, stiffer, or less pliable than the cover 130. Pliability aspects of the panels or the cover 130, or a combination thereof, may facilitate supporting the cable 50.

The mattress 112 in FIGS. 6-9 includes a cover 130 that includes an upper cover portion and a lower cover portion 132, which, like the cover 30, may be joined together at a seam by a perimeter zipper, such as a full perimeter zipper or partial perimeter zipper, to facilitate removal for cleaning or replacement of the cover from the mattress 112. Similar to the cover 30, the upper and lower portions of the cover 130 may be joined by a seam formed by stitching so that the upper cover portion 34 is not completely detachable from lower cover portion 132, and with the remainder of the upper portion and the lower cover portion 132 of cover 30 joined with a partial perimeter zipper, e.g., a zipper that extends only around a portion of the perimeter of the main cushion 12. The location of the zipper may vary, but in one aspect the zipper is located along longitudinal and lateral sides between the top and lower sides of the mattress 112 and, optionally, about midway between the top and lower sides mattress 112.

The mattress 112, in one aspect, may include a cable support assembly 190 operable to support the cable 50 in position with respect to the mattress 112. As described herein, the second connection 78 that supports and anchors the cable 50 is proximal to the aperture of the cover 30. The second connection is provided on the outer side 80 of the mattress control housing 70. In some configurations, the mattress control housing 70 may be narrower than a mattress, and so the second connection 78 may not be available in proximity to an opening through a cover. For instance, the cable 50 may not be securable directly to the side of the mattress control housing 70 in proximity to the opening of the cover 30.

The cover 130 of the mattress 112 may serve as both to support the cable 50 and to provide access for the cable 50 to pass from within the cover 130 for external connection to the second connector 60. For instance, the cover 130 may include a cable support assembly 190 that is integral to the cover 130, and that is operable to support the cable 50 and to provide passage for the cable 50 from an internal space of the cover 130 to an area external to the cover 130.

In one aspect, the cover 130 may include an opening 194 through which the cable 50 may pass. The opening 194 may be reinforced (e.g., via RF welding) to substantially prevent ripping or distortion of the opening 194 during use.

In one aspect, the cable support assembly 190 may include an exterior panel 192 and an interior panel 195. The exterior panel 192 may cover the opening 194 of the cover 130 and may be operable as a moisture shield to facilitate preventing moisture intrusion through the opening 194 of the cover 130. The exterior panel 192, as described herein, may correspond to a flap, but the present disclosure is not so limited—the exterior panel 192 may be configured differently depending on the application.

Figure 7:
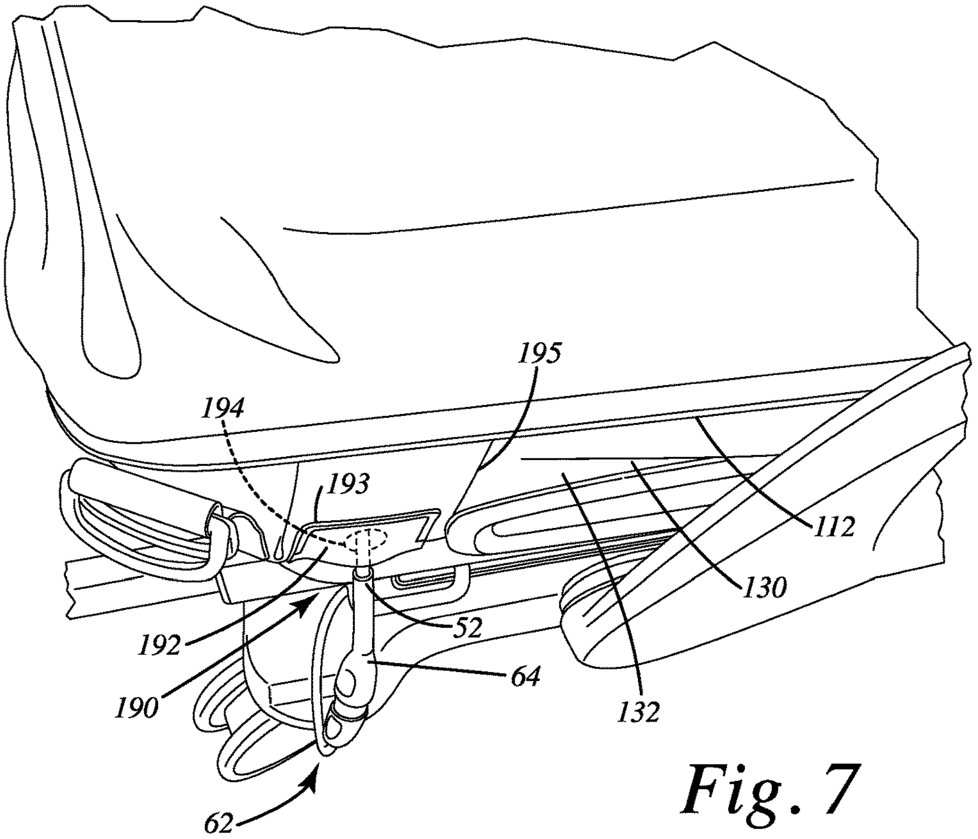
FIG. 7 is another perspective view of the patient support apparatus of FIG. 6.
Figure 8:
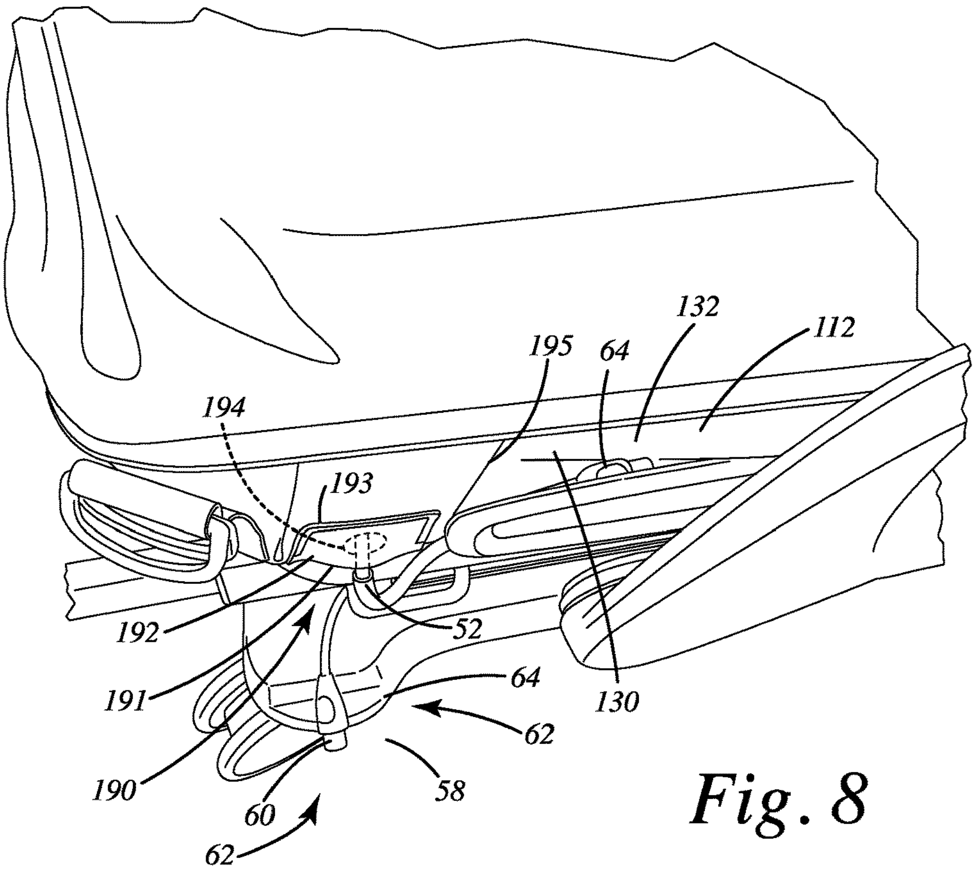
FIG. 8 is an enlarged view of the patient support apparatus in FIG. 7.

The exterior panel 192 in FIGS. 7 and 8 is joined to the cover 130 via a panel connection 193, which may be provided in the form of a welded joint (e.g., an RF welded joint) between the exterior panel 192 and the cover 130. The panel connection 193 may form a water tight seal above the opening 194, such that the panel connection 193 in conjunction with the exterior panel 192 that covers the opening 194 facilitate preventing moisture intrusion through the opening 194. The panel connection 193 may optionally extend from above the opening 194 along the sides of the exterior panel 192 below a lower most portion of the opening 194, further facilitating shielding the opening 194 from moisture intrusion.

In one aspect, the panel connection 193 between the cover 130 and the exterior panel 192 may join the exterior panel 192 to the cover 130 leaving an opening 191 between the cover 130 and the exterior panel 192 that is below a lower most portion of the opening 194. For instance, the panel connection 193 may be provided about at least a portion of the perimeter of the exterior panel 192 above and to the sides of and extending below the opening 194, thereby providing access for the cable 50, via the opening 191, between the exterior panel 192 and the cover 130 below the opening 194. More specifically, in this example, the panel connection 193 may provide a C-shaped joint or upside down U-shaped joint between the cover 130 and the exterior panel 192, with the opening 191 formed by such a joint being lower than the opening 194 of the cover 130.

Figure 9:
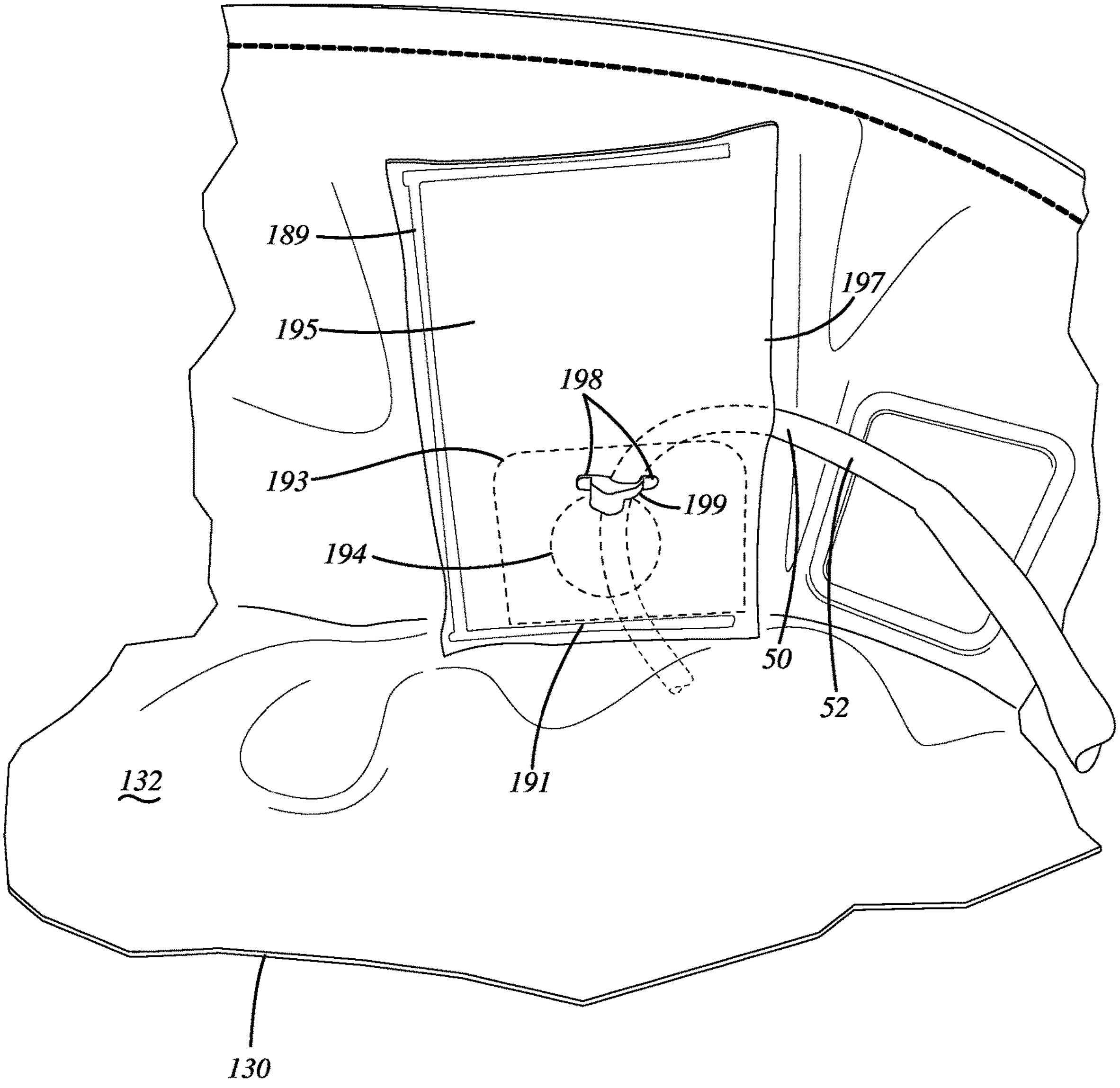
FIG. 9 is an interior view of the patient support apparatus of FIG. 8.

Turning to FIG. 9, the interior side of the cover 130 is shown with the interior panel 195 visible. The interior panel 195, as described here in, may correspond to a flap provided on an interior surface of the cover 130. The interior panel 195 is joined to the cover via an interior panel connection 189, which, like the panel connection 193, may be provided in the form of a welded joint between the interior panel 195 and the cover 130. The interior panel connection 189 may form a watertight seal between the interior panel 195 and the cover 130, facilitating shielding or avoiding moisture intrusion into an internal space of the cover 130. The interior panel connection 189 may be provided about at least a portion of a perimeter of the interior panel 195.

The interior panel connection 189 may join the cover 130 and the interior panel 195 with an opening 197 provided to a side of the interior panel 195 (e.g., the top, bottom, left, or right sides). For instance, the interior panel 195 may be joined with the cover 130 above, below and to one side of the opening 194 of the cover 130. More specifically, the interior panel connection 189 may provide a C-shaped joint or U-shaped joint between the cover 130 and the interior panel 195, with the opening 197 provided to a side of the opening 194.

It is noted that the interior panel connection 189 and the panel connection 193 are shown in FIGS. 6-9 as including generally straight sections. The present disclosure is not so limited—the panel connections may include curved or non-linear sections. It is further noted that the shape of the interior panel 189, the panel connection 193, or the opening 194 may be any shape and is not limited to the shapes depicted in the figures. For instance, the opening 194 may be any shape that allows exit of the cable.

In one aspect, the positioning of the openings 191, 197 relative to the opening 194 of the cover 130 may both enable passage of the cable from an internal space to an external space of the cover 130 and substantially prevent water intrusion into the internal space of the cover 130. For instance, the opening 191 may be below the opening 194 of the cover 130, and the opening 197 may be positioned to a side of the opening 194 of the cover 130. This arrangement of the openings 191, 197 with respect to the opening 194 of the cover 130 may prevent a drip path from being present relative to the external and internal areas of the cover 130. In other words, the arrangement of the openings 191, 197 relative to the opening 194 does not provide a substantial path for water, under gravity and exterior to the cover 130, to flow or intrude through the opening 194 of the cover 130.

The position of the opening 197 in FIG. 9 facilitates passage of the cable 50 through the opening 194 and the opening 191 without substantially flexing or bending the cable 50. It is to be understood that the opening 197 may be positioned differently depending on the configuration of the interior panel connection 189, including, for instance, the opening 197 being above the opening 194 of the cover 130 rather than to a side of the opening 194.

The interior panel 195 may include a cable support interface 198 operable to support the cable 150 in conjunction with a fastener 199. The cable support interface 198, in one aspect, may include first and second apertures provided in the interior panel 195 that facilitate joining the cable 50 to the interior panel 195 via the fastener 199. For instance, the fastener 199 may correspond to a zip tie that loops through the first and second apertures and around the cable 50 in order to fasten the cable 50 to the interior panel 195. By fastening the cable 50 to the interior panel 195, the interior panel by virtue of being joined to the cover 130 may support the cable 50 in position relative to the opening 194 and proximal to the opening 194. The cable support interface 198 is not limited to being on the interior panel 195, and may be located at any location on the patient support apparatus 100, including, for instance, the cover 130.

The exterior panel 192 and the interior panel 195, in one aspect, may sandwich the cover 130 of the mattress 112.

In one aspect, the cable support assembly 190 may include a multi-flap configuration that utilizes material that is pliable and able to be RF welded to the cover 130. The inside flap may be welded in a "C" shape to allow the cable to pass through the side of the cover 130. The inside flap may include two holes to secure the cable 50 to the flap via a zip tie. The lower cover portion 132 of the cover 130 may include an RF welded, reinforced hole for the cable 50 to pass through. On the outside of the cover 130, an RF welded outside flap may be provided where the cable 50 protrudes and the first connector 58 connects to the second connector 60. The outside flap may completely cover the hole in the lower cover portion 132 to substantially prevent fluid intrusion.

The cable support assembly 190 may be utilized to support the cable without making significant changes to foot-end foam of the mattress 112. The foam may also help to compress or "sandwich" the inside retaining flap (e.g., the interior panel 195, providing additional support to the cable 50. The zip tie retaining the cable 50 may be secured around the outer cable jacket of the cable 50 rather than the sleeve 64. This may allow the cable 50 to flex more (and retain less cable memory) relative to the zip tie retainment cable during shipping and when the mattress 112 is stored off of a bedframe.

For examples of mattresses with pneumatic systems that employ various bladders to support a patient and bladders to provide therapeutic functions, reference is made to U.S. Pat. No. 8,910,334 (STR03A-P239A); U.S. Pat. No. 8,911,387 (STR03A-P257A); U.S. Pat. Nos. 7,406,736; 9,820,904 (STR03A-P376A); and U.S. Pat. No. 9,468,307 (STR03A P400A), which are commonly owned by Stryker Corporation of Kalamazoo, Michigan, and are incorporated by reference in their entireties herein.

Another suitable mattress is disclosed in commonly assigned U.S. patent application Ser. Nos. 61/696,819, which is the provisional application to U.S. Non-Provisional application Ser. No. 13/836,813 (STR03A P400A), now U.S. Pat. No. 9,468,307, and 61/697,010, which is the provisional application to U.S. Non-Provisional application Ser. No. 14/019,353 (P-405E), now U.S. Pat. No. 9,420,895, entitled INFLATABLE MATTRESS AND CONTROL METHODS and PATIENT SUPPORT, respectively, both of which were filed on Sep. 5, 2012, which are hereby incorporated herein by reference in their entireties. Such mattresses comprise a plurality of inflatable bladders whose inflation pressure is controllable by one or more controllers contained with the mattress. The mattress may further comprise a plurality of sensors used for detecting information about the status of the mattress, such as, but not limited to, one or more depth sensors, fluid pressure sensors, temperature sensors, patient interface pressure sensors, and/or humidity sensors.

It will be understood by those skilled in the art that patient support apparatus 10 can be designed with other types of mechanical constructions, such as, but not limited to, that described in commonly assigned, U.S. Pat. No. 10,130,536 to Roussy et al., entitled PATIENT SUPPORT USABLE WITH BARIATRIC PATIENTS, the complete disclosure of which is incorporated herein by reference. In another embodiment, the mechanical construction of patient support apparatus 10 may be the same as, or nearly the same as, the mechanical construction of the Model 3002 S3 bed manufactured and sold by Stryker Corporation of Kalamazoo, Michigan. This mechanical construction is described in greater detail in the Stryker Maintenance Manual for the MedSurg Bed, Model 3002 S3, published in 2010 by Stryker Corporation of Kalamazoo, Michigan, the complete disclosure of which is incorporated herein by reference. It will be understood by those skilled in the art that patient support apparatus 10 can be designed with still other types of mechanical constructions, such as, but not limited to, those described in commonly assigned, U.S. Pat. No. 7,690,059 issued to Lemire et al., and entitled HOSPITAL BED; and/or commonly assigned U.S. Pat. publication No. 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the complete disclosures of both of which are also hereby incorporated herein by reference. The mechanical construction of patient support apparatus 10 may also take on still other forms different from what is disclosed in the aforementioned references.

The patient support apparatus 10 may also incorporate a bed exit detection function adapted to issue an alert when a patient exits from patient support apparatus 10. Such an exit detection function may include any of the same features and/or functions as, and/or may be constructed in any of the same manners as, the exit detection systems disclosed in commonly assigned U.S. patent application 62/889,254 filed Aug. 20, 2019, by inventors Sujay Sukumaran et al. and entitled PERSON SUPPORT APPARATUS WITH ADJUSTABLE EXIT DETECTION ZONES; U.S. patent application Ser. No. 17/318,476 filed May 12, 2021, by inventors Sujay Sukumaran et al. and entitled PATIENT SUPPORT APPARATUS WITH AUTOMATIC EXIT DETECTION MODES OF OPERATION; and/or the exit detection system disclosed in commonly assigned U.S. Pat. No. 5,276,432 issued to Travis and entitled PATIENT EXIT DETECTION MECHANISM FOR HOSPITAL BED, the complete disclosures of all of which are incorporated herein by reference.

Further details of one type of monitoring system that may be built into patient support apparatus 10 are disclosed in commonly assigned U.S. patent application Ser. No. 62/864,638 filed Jun. 21, 2019, by inventors Kurosh Nahavandi et al. and entitled PATIENT SUPPORT APPARATUS WITH CAREGIVER REMINDERS, as well as commonly assigned U.S. patent application Ser. No. 16/721,133 filed Dec. 19, 2019, by inventors Kurosh Nahavandi et al. and entitled PATIENT SUPPORT APPARATUSES WITH MOTION CUSTOMIZATION, the complete disclosures of both of which are incorporated herein by reference. Other types of monitoring systems may be included within patient support apparatus 10 for monitoring parameters of the patient support apparatus 10.

In some embodiments, patient support apparatus 10 may incorporate a scale system that may include any of the same features, components, and/or and functions as the scale systems disclosed in the following commonly assigned patent references: U.S. patent application Ser. No. 62/889,254 filed Aug. 20, 2019, by inventors Sujay Sukumaran et al. and entitled PERSON SUPPORT APPARATUS WITH ADJUSTABLE EXIT DETECTION ZONES; U.S. patent application Ser. No. 63/255,211 filed Oct. 13, 2021, by inventors Sujay Sukumaran et al. and entitled PATIENT SUPPORT APPARATUS WITH AUTOMATIC SCALE FUNCTIONALITY; U.S. Pat. No. 10,357,185 issued to Marko Kostic et al. on Jul. 23, 2019, and entitled PERSON SUPPORT APPARATUSES WITH MOTION MONITORING; U.S. Pat. No. 11,330,233 issued to Michael Hayes et al. on Jun. 15, 2021, and entitled PATIENT SUPPORT APPARATUS WITH PATIENT INFORMATION SENSORS; U.S. patent application Ser. No. 16/992,515 filed Aug. 13, 2020, by inventors Kurosh Nahavandi et al. and entitled PATIENT SUPPORT APPARATUS WITH EQUIPMENT WEIGHT LOG; and U.S. patent application Ser. No. 63/255,223, filed Oct. 13, 2021, by inventors Sujay Sukumaran et al. and entitled PATIENT SUPPORT APPARATUS WITH PATIENT WEIGHT MONITORING, the complete disclosures of all of which are incorporated herein by reference. The scale system may utilize the same force sensors that are utilized by the exit detection system, in some embodiments, or it may utilize one or more different sensors.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles “a,” “an,” “the” or “said,” is not to be construed as limiting the element to the singular.

The invention claimed is:

1. A patient support apparatus comprising:

a frame;

a side rail mounted relative to the frame, the side rail being spaced from the frame to form an envelope therebetween and being movable between raised and lowered positions;

a mattress supported relative to said frame; and a mattress power and/or communication cable, wherein at least a portion of the cable is provided with increased stiffness to maintain the cable in the envelope to reduce disconnection of the cable during use of the patient support apparatus, wherein the cable includes at least a first cable portion connected to the mattress and a second cable portion connected to the frame or another component at the patient support apparatus, the cable also includes a first connector coupled to the first cable portion and a second connector coupled to the second cable portion forming a connector assembly, the connector assembly configured as a breakaway connection.

2. The patient support apparatus according to claim 1, wherein at least one of the first and second cable portions includes a sleeve extending around the cable portion to stiffen the one cable portion adjacent the connector mounted to the one cable portion.

3. The patient support apparatus according to claim 2, wherein the sleeve extends from the respective connector along the respective cable portion in a range of 5-10 inches, in a range of 6-8 inches, or 7½ inches.

4. The patient support apparatus according to claim 3, wherein the respective connector has a connector body and a transition between the connector body and the respective cable portion, wherein the sleeve on the one cable portion extends around a portion of the respective connector, and wherein the sleeve is flared to at least partially cover the respective connector body.

5. The patient support apparatus according to claim 3, wherein each cable portion has a sleeve, with a first sleeve on the first cable portion, and a second sleeve on the second cable portion.

6. The patient support apparatus according to claim 3, wherein the cable has a longitudinal axis that extends between the first and second connectors, wherein each of the connectors has a length extending along the longitudinal axis, with the sleeve extending along the respective cable portion for at least the length of the respective connector.

7. The patient support apparatus according to claim 3, wherein the cable has a cable core and a cable casing surrounding the cable core, the sleeve having a greater thickness than the cable casing.

8. The patient support apparatus according to claim 3, wherein the cable has a cable core and a cable casing surrounding the cable core, with the cable casing being formed from a first material having a first stiffness, and wherein the sleeve is formed from a second material having a second stiffness greater than the first stiffness of the first material of the cable casing.

9. The patient support apparatus according to claim 1, wherein the frame includes a litter frame and an articulatable litter deck supported on the litter frame, the litter deck having a top side, and the envelope being defined below the top side of the litter deck, wherein the breakaway connection is located in the envelope.

10. The patient support apparatus of claim 2, wherein the mattress includes a mattress control housing, and wherein the first cable portion is secured to a side of the mattress control housing along the sleeve.

11. The patient support apparatus of claim 1, wherein the mattress includes a cable support assembly that is integral to the mattress.

12. The patient support apparatus of claim 11, wherein the cable support assembly includes an exterior panel and an interior panel, and wherein the interior panel is coupled to the cable.

13. The patient support apparatus of claim 1, wherein the connector assembly comprises a magnetic breakaway connector assembly.

14. A patient support apparatus comprising:
- a frame;
- a side rail mounted relative to the frame, the side rail being spaced from the frame to form an envelope therebetween and being movable between raised and lowered positions;
- a mattress supported relative to said frame; and
- a mattress power and/or communication cable, wherein at least a portion of the cable is provided with increased stiffness to maintain the cable in the envelope to reduce disconnection of the cable during use of the patient support apparatus,
- wherein the mattress includes a cable support assembly that is integral to the mattress,
- wherein the cable support assembly includes an exterior portion and an interior portion, and wherein the interior portion receives the cable,
- wherein the exterior portion is coupled to the mattress and at least in part defines an opening through which the cable passes, wherein the opening is disposed below a separate opening in the mattress to substantially prevent intrusion of water into the mattress.

15. A patient support apparatus comprising:
- a frame;
- a side rail mounted relative to the frame, the side rail being spaced by a distance from the frame and being movable between raised and lowered positions;
- a mattress supported relative to said frame; and
- a mattress cable configured for at least one of power and communication, at least a portion of the mattress cable being provided with increased stiffness to maintain the mattress cable in a space between the side rail and the frame to reduce disconnection of the mattress cable during use of the patient support apparatus,
- wherein the mattress cable includes at least a first cable portion connected to the mattress and a second cable portion connected to the frame or another component at the patient support apparatus, wherein the mattress cable includes a first connector coupled to the first cable portion and a second connector coupled to the second cable portion forming a connector assembly, the connector assembly configured as a breakaway connection.

16. The patient support apparatus of claim 15, wherein the connector assembly is provided in the space between the side rail and the frame.

17. The patient support apparatus of claim 15, wherein at least one of the first and second cable portions includes a sleeve extending around the respective first and second cable portions, wherein the sleeve provides stiffness adjacent a respective one of the first and second connectors mounted to the at least one first and second cable portions.

18. The patient support apparatus of claim 17, wherein the respective one of the first and second connectors has a connector body and a transition between the connector body and a respective one of the first and second cable portions, and wherein the sleeve on the respective one of the first and second cable portions extends around a portion of the respective one of the first and second connectors.

19. The patient support apparatus of claim 17, wherein the mattress includes a mattress control housing, and wherein the first cable portion is secured to a side of the mattress control housing along the sleeve.

20. The patient support apparatus of claim 15, wherein the mattress includes a cable support assembly that is integral to the mattress.

21. The patient support apparatus of claim 20, wherein the cable support assembly includes an exterior panel and an interior panel, and wherein the interior panel is coupled to the mattress cable.

22. A patient support apparatus comprising:
- a frame;
- a side rail mounted relative to the frame, the side rail being spaced by a distance from the frame and being movable between raised and lowered positions;
- a mattress supported relative to said frame; and
- a mattress cable configured for at least one of power and communication, at least a portion of the mattress cable being provided with increased stiffness to maintain the mattress cable in a space between the side rail and the frame to reduce disconnection of the mattress cable during use of the patient support apparatus, wherein the mattress includes a cable support assembly that is integral to the mattress, wherein the cable support assembly includes an exterior portion and an interior portion, and wherein the interior portion receives the mattress cable, wherein the exterior portion is coupled to the mattress and at least in part defines an opening through which the mattress cable passes, wherein the opening is disposed below a separate opening in the mattress to substantially prevent intrusion of water into the mattress.

* * * * *